United States Patent
Myren et al.

(10) Patent No.: US 9,984,578 B2
(45) Date of Patent: May 29, 2018

(54) DIGITAL MAP ENABLED BOUNDARY SEARCH PATTERN

(71) Applicant: Rockwell Collins, Inc., Cedar Rapids, IA (US)

(72) Inventors: Jason A. Myren, Marion, IA (US); Douglas M. McCormick, North Liberty, IA (US); Benjamin M. Helppi, Anamosa, IA (US); Christina M. Martinez, Rio Rancho, NM (US); Evie R. Johnson, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days. days.

(21) Appl. No.: 15/145,670

(22) Filed: May 3, 2016

(65) Prior Publication Data

US 2017/0323570 A1   Nov. 9, 2017

(51) Int. Cl.
*G08G 5/00* (2006.01)
*G05D 1/02* (2006.01)
*G05D 1/10* (2006.01)
*G01C 21/20* (2006.01)
*G05D 1/00* (2006.01)
(Continued)

(52) U.S. Cl.
CPC .......... *G08G 5/0034* (2013.01); *B64D 47/08* (2013.01); *G01C 21/20* (2013.01); *G01C 23/00* (2013.01); *G05D 1/00* (2013.01); *G05D 1/02* (2013.01); *G05D 1/10* (2013.01); *G05D 1/101* (2013.01); *G08G 5/00* (2013.01); *G08G 5/0021* (2013.01); *G08G 5/0026* (2013.01); *G09B 5/06* (2013.01)

(58) Field of Classification Search
CPC .......... G08G 5/0034; G08G 5/00; G08G 5/02; G08G 5/025; G08G 5/0021; G08G 5/0026; G08G 5/0013; G08G 5/0069; G08G 5/006; G08G 5/003; G08G 5/0039; G08G 5/06; G09B 5/06; B64D 47/08; G01C 21/20; G01C 21/00; G01C 23/00; G05D 1/00; G05D 1/101; G05D 1/02; G05D 1/0094; G05D 1/0202; H04L 12/26; H04L 29/06; H04L 29/08; H04L 43/0823; H04L 63/08; H04L 67/12; G06Q 10/08; G06Q 10/087
See application file for complete search history.

(56) References Cited

U.S. PATENT DOCUMENTS

7,158,878 B2   1/2007   Rasmussen et al.
7,373,246 B2   5/2008   O'Clair
(Continued)

*Primary Examiner* — Behrang Badii
(74) *Attorney, Agent, or Firm* — Angel N. Gerdzhikov; Donna P. Suchy; Daniel M. Barbieri (57) ABSTRACT

A system and related methods for digital map enabled search pattern generation by a flight management system retrieves from a digital map a set of pattern points corresponding to a selected search pattern parameter, such as a coastline, boundary, lateral terrain feature, or manmade structure, and a designated search area. The flight management system generates a sequence of waypoints based on the set of pattern points and a variable search radius, the sequence of waypoints optimizing efficient coverage of the search pattern parameter. The flight management system generates a full search pattern based on the generated sequence of waypoints; the generated search pattern may be approved or evaluated by the FMS, or forwarded to a rerouter for modification according to terrain avoidance factors.

20 Claims, 10 Drawing Sheets

(51) Int. Cl.
   *G09B 5/06* (2006.01)
   *G01C 23/00* (2006.01)
   *B64D 47/08* (2006.01)

(56) References Cited

U.S. PATENT DOCUMENTS

| | | | |
|---|---|---|---|
| 7,606,659 B2 | 10/2009 | Erignac | |
| 7,698,058 B2 | 4/2010 | Chen et al. | |
| 7,698,059 B2 | 4/2010 | O'Clair | |
| 7,856,314 B2 | 12/2010 | Erignac | |
| 8,068,980 B2 | 11/2011 | O'Clair | |
| 8,646,719 B2 * | 2/2014 | Morris | B64C 27/02 244/1 TD |
| 8,886,668 B2 | 11/2014 | Liao | |
| 8,930,044 B1 * | 1/2015 | Peeters | B64C 19/00 701/2 |
| 8,941,677 B1 | 1/2015 | Hallenbeck | |
| 9,002,384 B1 | 4/2015 | Hallenbeck | |
| 9,495,883 B2 * | 11/2016 | Burgin | G09B 5/06 |
| 9,606,534 B2 * | 3/2017 | Mere | G05D 1/00 |
| 2010/0250022 A1 * | 9/2010 | Hines | G05D 1/101 701/2 |
| 2014/0222246 A1 * | 8/2014 | Mohamadi | G01S 13/913 701/2 |
| 2015/0066248 A1 * | 3/2015 | Arbeit | G01C 21/20 701/2 |
| 2015/0105946 A1 * | 4/2015 | Kumar | B64C 39/024 701/3 |
| 2017/0147008 A1 * | 5/2017 | Mere | G05D 1/101 |

* cited by examiner

DIGITAL MAP ENABLED BOUNDARY SEARCH PATTERN

BACKGROUND

A Flight Management System (FMS) may allow the pilot or crew of an aircraft to define a search pattern or other predetermined flight pattern, by manually entering points into the FMS. Each manually entered point would correspond to a particular latitude and longitude, and the set of points would define an impromptu path. However, this process is cumbersome and inefficient. Furthermore, the manual definition of a search path or pattern may involve an imprecise selection of points that fails to account for changing conditions (e.g., difficult terrain combined with degraded visual environment) that may variably affect the pilot's visual search ability as well as enhanced vision systems that may augment a visual search by sensing outside the visible spectral band.

SUMMARY

In one aspect, embodiments of the inventive concepts disclosed herein are directed to a digital map enabled flight management system (FMS) for generating search patterns. The FMS may include a graphical flight planner (GFP) for defining a coastline or other feature for a search pattern to follow and an area within which the search pattern is to be followed by an aircraft. The FMS may retrieve from a digital map a set of pattern points corresponding to the defined coastline or feature. The FMS may include processors for generating a set of search pattern waypoints based on the set of pattern points and a predetermined search radius. The FMS processors may generate a flight pattern based on the generated set of waypoints and a track space offset. The FMS may display the defined parameters and search area, the set of pattern points, the set of waypoints, and the generated flight pattern via a display unit of the aircraft.

In a further aspect, embodiments of the inventive concepts disclosed herein are directed to an apparatus for digital map enabled search pattern generation. The apparatus may determine a coastline, boundary, natural feature, manmade feature, or other parameter for a search to follow and an area within which the search parameter is to be followed by an aircraft. The apparatus may retrieve from a digital map an ordered set of pattern points corresponding to the determined search parameter each pattern point located within the determined area. The apparatus may generate an ordered set of waypoints based on the set of pattern points and a predetermined search radius. The apparatus may generate a search pattern based on the generated set of waypoints and a predetermined track space offset.

In a still further aspect, embodiments of the inventive concepts disclosed herein are directed to a method for digital map enabled search pattern generation. The method may include determining a coastline, boundary, or other search parameter via an FMS. The method may include determining, via the FMS, an area within which the search parameter is to be followed. The method may include retrieving from a digital map an ordered set of pattern points located within the determined area and corresponding to the determined search parameter. The method may include generating, via the FMS, an ordered set of waypoints based on the set of pattern points and a predetermined search radius. The method may include generating, via the FMS, a flight pattern based on the ordered set of waypoints and a track space offset.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for digital map integration by a flight management system. The digital map may reduce pilot workload by graphically generating search patterns based on desired features (such as a coastline, boundary, or lateral terrain feature) and a desired search area. The generated search patterns may be optimized for specific search or surveillance objectives, atmospheric conditions, or the sensor capabilities and performance specifications of specific search aircraft.

Figure 1:
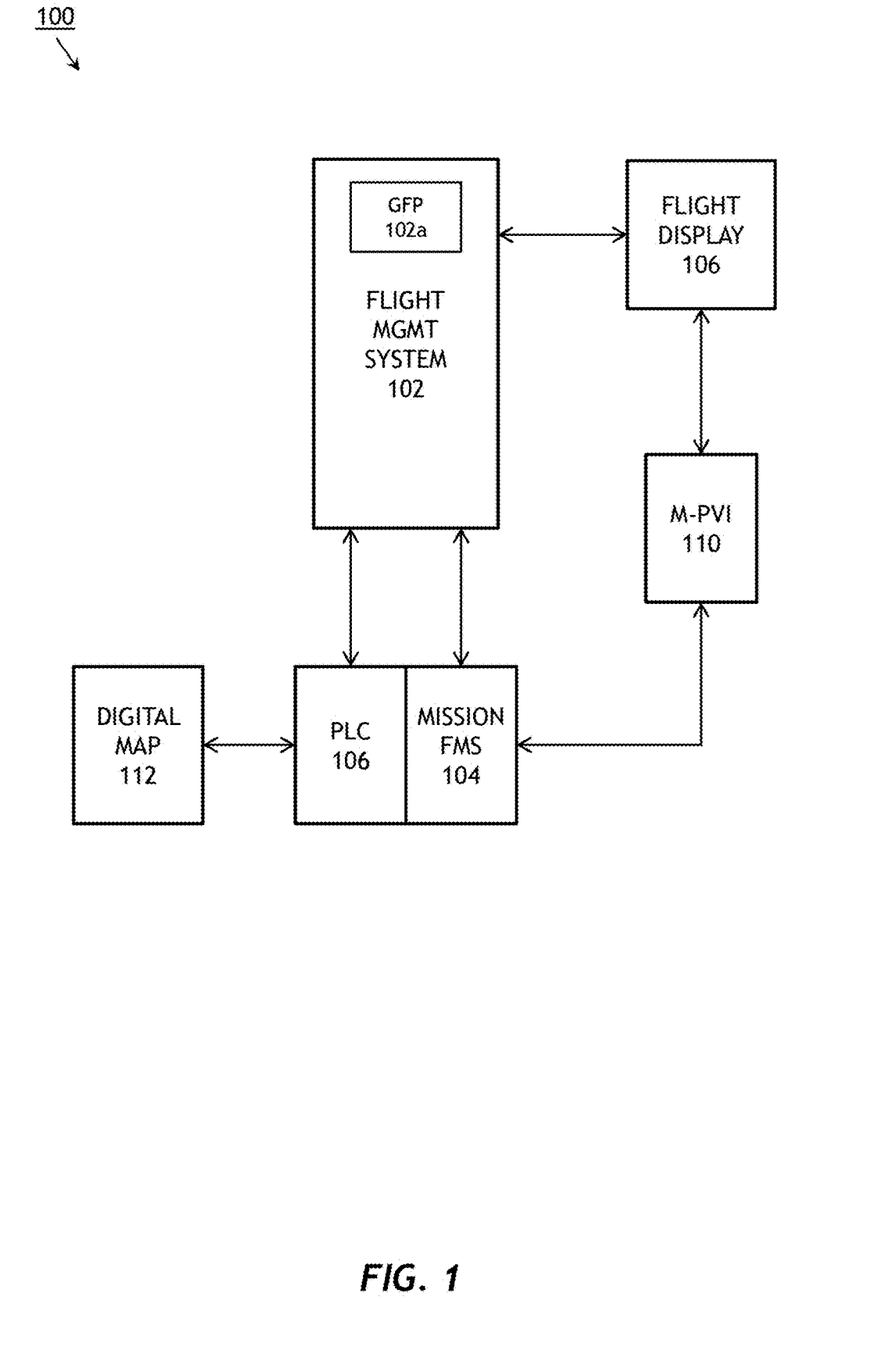
FIG. 1 is a block diagram illustrating an exemplary embodiment of a flight management system (FMS) according to the inventive concepts disclosed herein.

Referring to FIG. 1, an exemplary embodiment of a flight deck 100 according to the inventive concepts disclosed herein may include a flight management system (FMS) 102 incorporating one or more processors on which flight management software applications (FMSA) including a graphical flight planner (GFP) 102a may execute. The flight deck 100 may include additional mission-specific flight management applications (e.g., a mission flight management system (MFMS) 104) and a pattern leg calculator (PLC) 106. The MFMS 104 may communicate with a display unit 108 via a mission-specific Mission-Pilot Vehicle Interface (M-PVI) 110, and the pattern leg calculator 106 may communicate directly with the digital map 112. The GFP 102a may graphically define map features selected by a pilot via the display unit 108. The display unit 108 may be a primary flight display (PFD) or head-down display (HDD) incorporating a touchscreen via which the pilot may directly input data to the FMS 102. In some embodiments, the FMS 102 may be embodied in a portable computing device such as a tablet or mobile device; the GFP 102a may generate a map for display by a touch-sensitive screen (display unit 108) of the mobile device, via which screen the pilot may interact with the displayed map. The display unit 108 may incorporate a non-touch-sensitive screen and other means of direct interaction with a displayed map, e.g., a keypad or mouse and a remotely controlled cursor. In addition, the pilot may select an area of the map within which a search pattern may be generated and executed. The pilot may directly indicate a portion of the map via a touchscreen of the display unit 108 (e.g., by tracing the portion with one or more fingers or a stylus) or via a remotely controlled cursor.

Figure 2A:
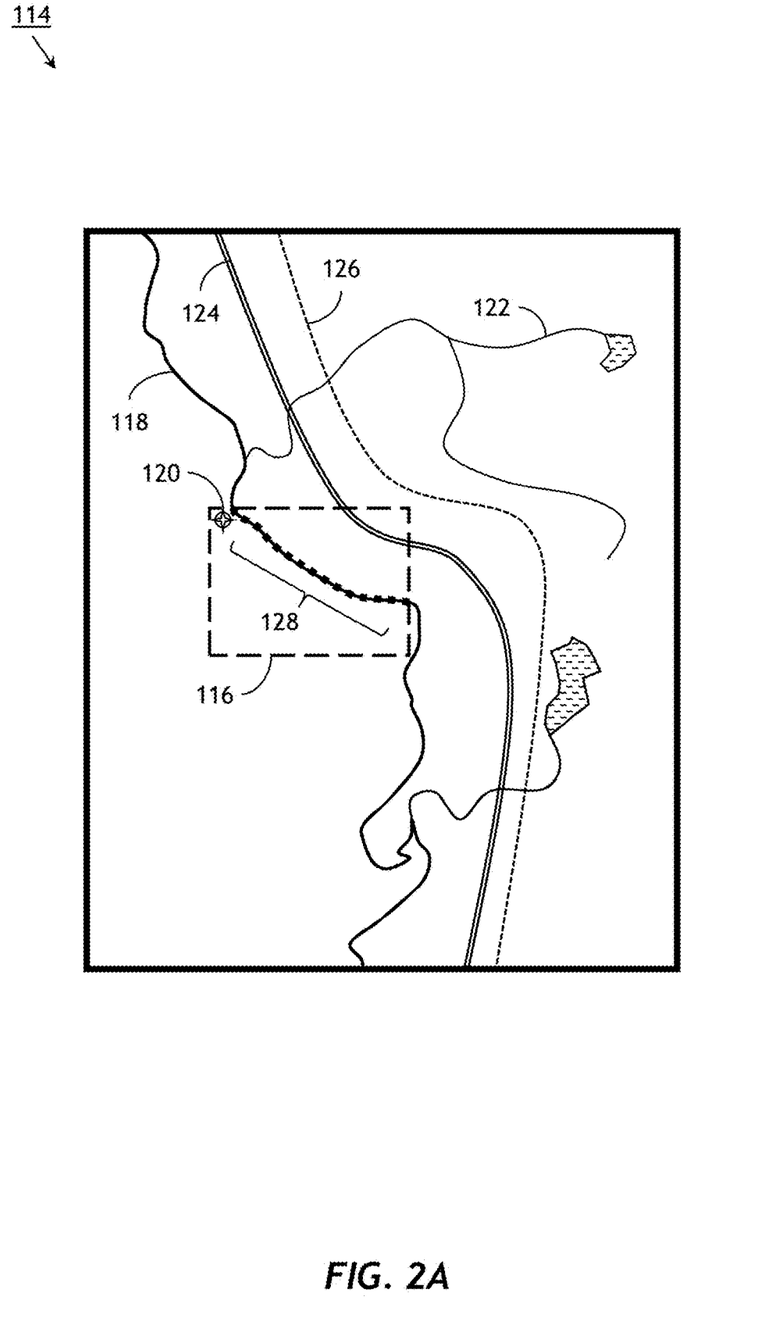
FIGS. 2A and 2B illustrate exemplary embodiments of map portions generated by the FMS of FIG. 1.

Based on a map feature selected by the pilot via the display unit 108 and GFP 102a, the PLC 106 may receive from the digital map 112 a point-by-point path representing a selected map feature within a selected portion of the map. Referring to FIG. 2A, a map portion 114 displayed by the display unit 108 of FIG. 1 may include a search pattern area 116 selected by the pilot, a coastline 118 to be followed by the search pattern, and a starting waypoint 120 corresponding to a starting point for the search pattern. The MFMS 104 (in the alternative, the FMS 102) may define a search pattern according to contextual parameters dependent upon an individual search. For example, the search may involve one or more manned or unmanned aircraft. The generated pattern may be optimized for, e.g., search and rescue, seek and destroy, surveillance, or a degraded visual environment (DVE) involving humidity, haze, smoke, or darkness. The pilot may select as a search pattern parameter a map feature, such as the coastline 118, that the search pattern will conform to or follow. The selected map feature may include the coastline 118, another natural feature such as a ridgeline or river 122, or a manmade structure such as a highway 124 or rail line 126. The pilot may select or define the search pattern area 116 as a quadrilateral or other polygon, or as a free-form area of the map (by, e.g., tracing the search pattern area 116 directly onto a touchscreen of the display unit 108 of FIG. 1). For example, the PLC 106 may receive from the digital map 112 (FIG. 1) a set of n pattern points 128 corresponding to the portion of the coastline 118 located within the search pattern area 116. Each pattern point $P(0) \ldots P(n-1)$ may correspond to the latitude and longitude of a point along the coastline portion, the initial pattern point $P(0)$ corresponding to the desired starting waypoint 118 of a generated search pattern. The value of n, or the size of the set of n pattern points 128 (and the precision with which the set of n pattern points 128 approximates the coastline portion) may vary depending on predetermined factors set by the pilot, by the MFMS 104, or by the MFMS 102 (e.g., according to the flight plan of the searching aircraft).

Figure 2B:
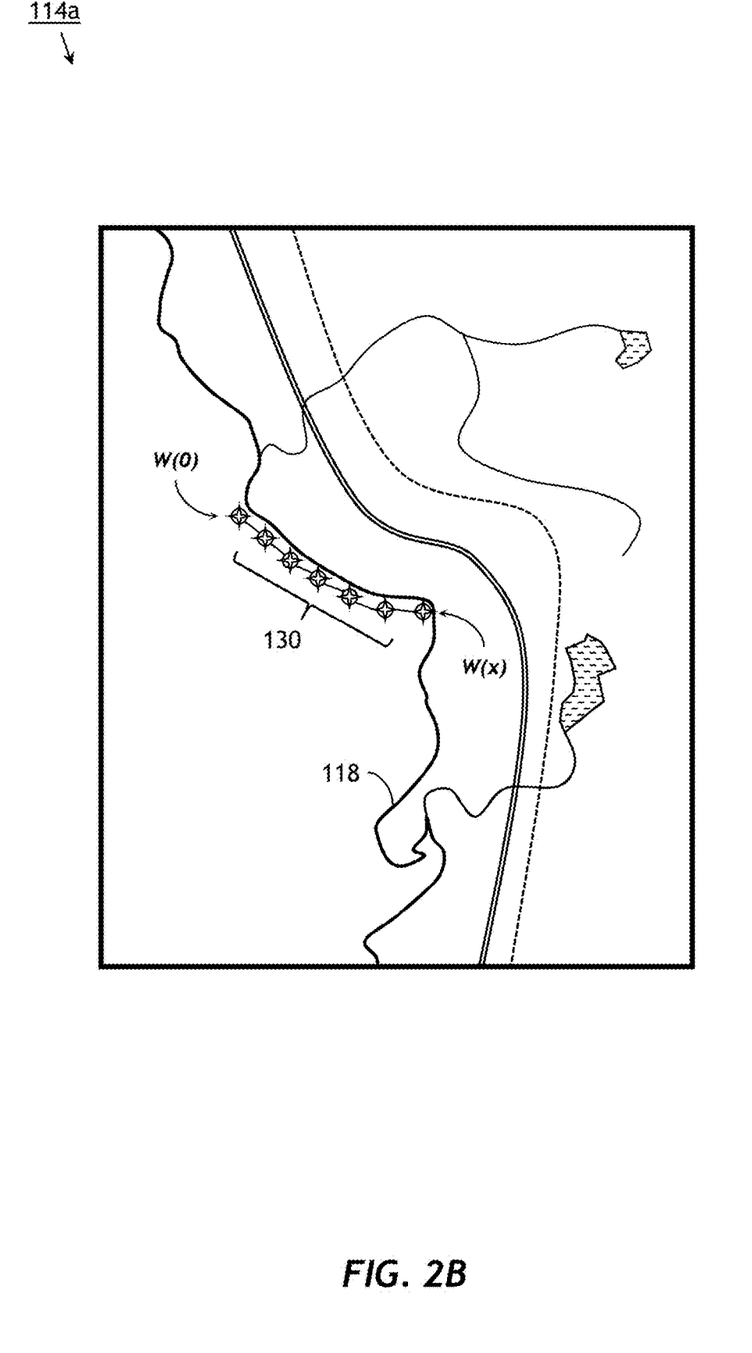

Referring to FIG. 2B, a map portion 114a displayed by the display unit 108 of FIG. 1 may operate similarly to the map portion 114 of FIG. 2A, except that the map portion 114a indicates the generation of a sequence of waypoints 130 by the MFMS 104 of FIG. 1. Each waypoint $W(0) \ldots W(x)$ of the sequence of waypoints 130 may be selected by the PLC 106 from the set of pattern points 128 (FIG. 2A) generated by the digital map 112 of FIG. 1. For example, the set of pattern points 128 may include too many individual pattern points for each individual pattern point to be practically included in a search pattern. In addition, an aircraft (or group of aircraft) flying at a predetermined altitude may cover sufficient ground via a combination of visible-band and non-visible electromagnetic sensors (e.g., infrared, radar) as to render a large set of closely spaced pattern points redundant. The MFMS 104 may generate the sequence of waypoints 130 with the aim of following the predetermined search pattern parameter (e.g., the coastline 118) while maximizing the surface coverage of an aircraft or group of aircraft and minimizing the time required or fuel consumed in the performance of the search.

Referring generally to FIGS. 3A through 3H, the sequence of waypoints 130 may be generated by the MFMS 104 of FIG. 1 based on the set of n pattern points 128 generated by the digital map 108 as well as a search radius 132. The search radius 132 may be selected by the pilot or predetermined by the FMS 100 according to a variety of contributing factors. For example, the search radius 132 may be dependent on one or more of: the specific model, capabilities (e.g., ground speed, bank rate), and specifications of the searching aircraft; the target or targets for which the aircraft is searching; the altitude at which the searching aircraft will operate; the visibility throughout the search pattern area 116 (e.g., humidity, darkness, haze, smoke); atmospheric conditions throughout the search pattern area 116 (e.g., wind speed); or the sea height throughout offshore portions of the search pattern area 116 (e.g., when the search pattern parameter is a coastline 118).

Figure 3A:
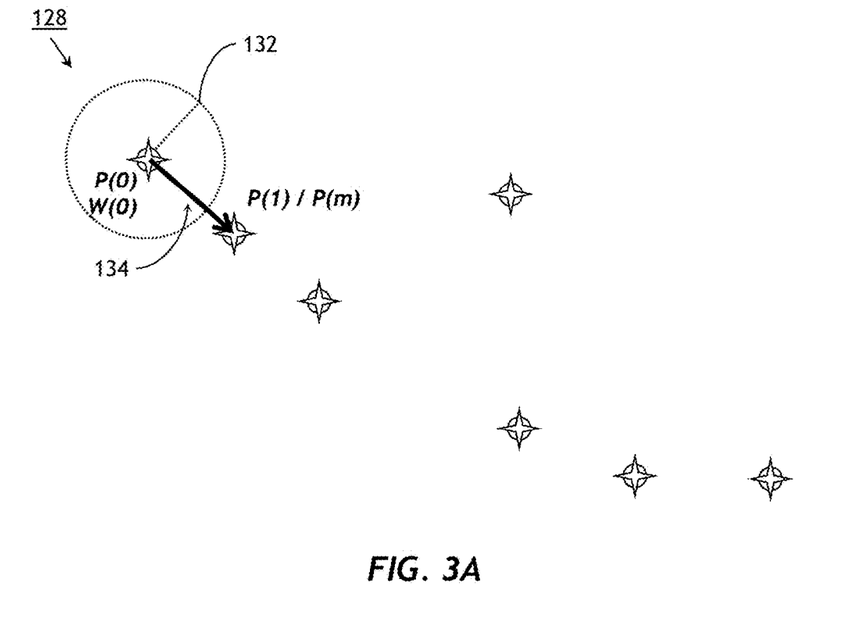
FIGS. 3A-3F illustrate exemplary embodiments of a set of pattern points generated by the FMS of FIG. 1.

Referring specifically to FIG. 3A, the first pattern point P(0) of the set of n pattern points 128 (P(0), P(1), . . . P(n−1)) may be designated as the first waypoint W(0) of the sequence of waypoints 130 (FIG. 2B). The MFMS 104 (FIG. 1) may connect the first waypoint W(0) (pattern point P(0)) to the next pattern point P(1) (designating pattern point P(1) as the current pattern point P(m)) by a straight line (134) and determine whether any pattern points between the current (last designated) waypoint W(x) and the current pattern point P(m), where m<n, are not within the search radius 132 of the line 134 connecting the current waypoint W(x) and the current pattern point P(m). As there are no pattern points between the current waypoint W(x) and the current pattern point P(m) (i.e., the pattern point P(1) is the current pattern point P(m)), there are no pattern points outside the search radius 132, and the MFMS 104 may increment m by designating the next pattern point P(m+1) (pattern point P(2)) as the current pattern point P(m).

Figure 3B:
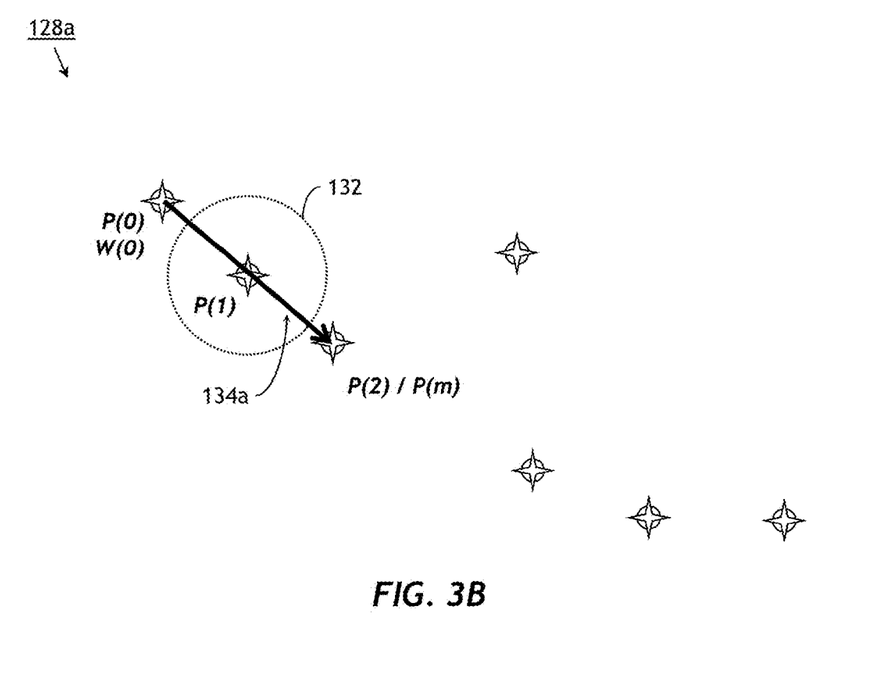

Referring specifically to FIG. 3B, the set of pattern points 128*a* may operate similarly to the set of n pattern points 128 of FIG. 3A, except that the set of pattern points 128*a* reflects the designation by the MFMS 104 (FIG. 1) of the pattern point P(2) as the current pattern point P(m). The MFMS 104 may connect the current waypoint W(x) (e.g., the first waypoint W(0)) to the current pattern point P(2) (via the line 134*a*) and determine whether any pattern points between W(x) and P(m) are not within the search radius 132 of the line 134*a*. As there are no such pattern points outside the search radius 132 (see, e.g., pattern point P(1)), the MFMS 104 may increment m.

Figure 3C:
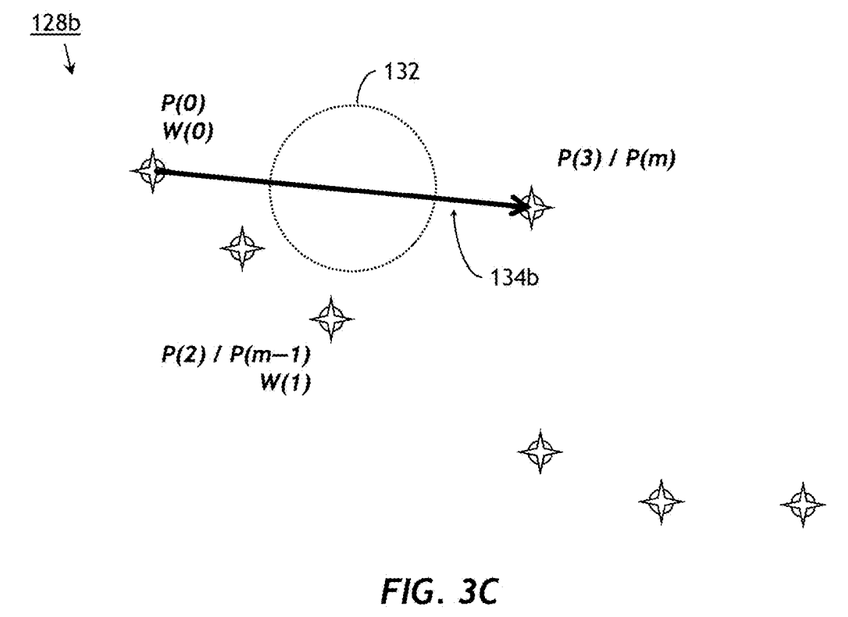

Referring specifically to FIG. 3C, the set of pattern points 128*b* may operate similarly to the set of pattern points 128*a* of FIG. 3B, except that the set of pattern points 128*b* reflects the designation by the MFMS 104 (FIG. 1) of the pattern point P(3) as the current pattern point P(m). The MFMS 104 may connect the current waypoint W(x) (e.g., the first waypoint W(0)) to the current pattern point P(3) (via the line 134*b*) and determine whether any pattern points between W(x) and P(m) are not within the search radius 132 of the line 134*b*. The pattern point P(2) is not within the search radius 132 of the line 134*b*, and the MFMS 104 may increment x by designating the pattern point P(m−1) (the pattern point P(2)) as the next waypoint W(x).

Figure 3D:
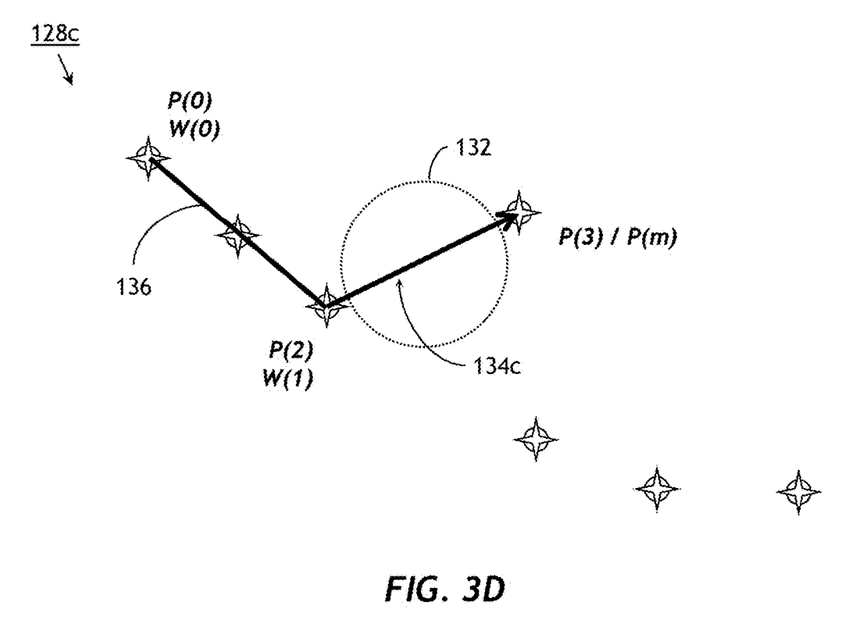

Referring specifically to FIG. 3D, the set of pattern points 128*c* may operate similarly to the set of pattern points 128*b* of FIG. 3C, except that the set of pattern points 128*c* reflects the designation by the MFMS 104 (FIG. 1) of the pattern point P(2) as the next waypoint W(1) of the sequence of waypoints 130 (FIG. 2B), generating a path (136) to the waypoint W(1) from the first waypoint W(0). The MFMS 104 may, via the line 134*c*, connect the current waypoint W(x) (e.g., the most recently designated waypoint W(1)) to the current pattern point P(m) (e.g., the pattern point P(3)) and determine whether any pattern points between W(x) and P(m) are not within the search radius 132 of the line 134*c*. There are no pattern points between W(x) and P(m), and the MFMS 104 may increment m by continuing to the next pattern point.

Figure 3E:
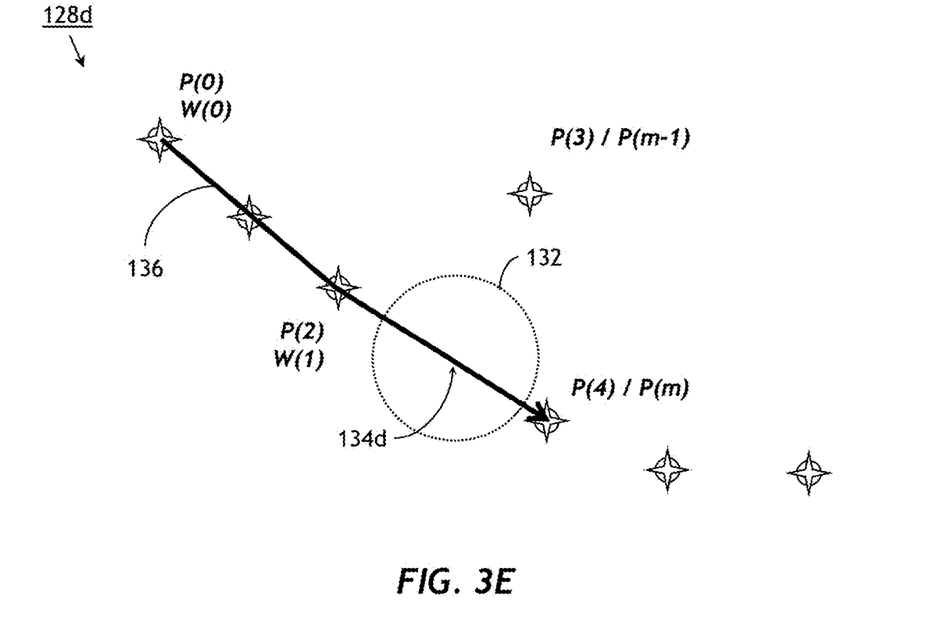

Referring specifically to FIG. 3E, the set of pattern points 128*d* may operate similarly to the set of pattern points 128*c* of FIG. 3D, except that the set of pattern points 128*d* reflects the designation by the MFMS 104 (FIG. 1) of the pattern point P(4) as the current pattern point P(m). The MFMS 104 may connect the current waypoint W(x) (e.g., the waypoint W(1)) to the current pattern point P(4) (via the line 134*d*) and determine whether any pattern points between W(x) and P(m) are not within the search radius 132 of the line 134*d*. The pattern point P(3) is not within the search radius 132 of the line 134*d*, and the MFMS 104 may increment x by designating the pattern point P(m−1) (the pattern point P(3)) as the next waypoint W(x).

Figure 3F:
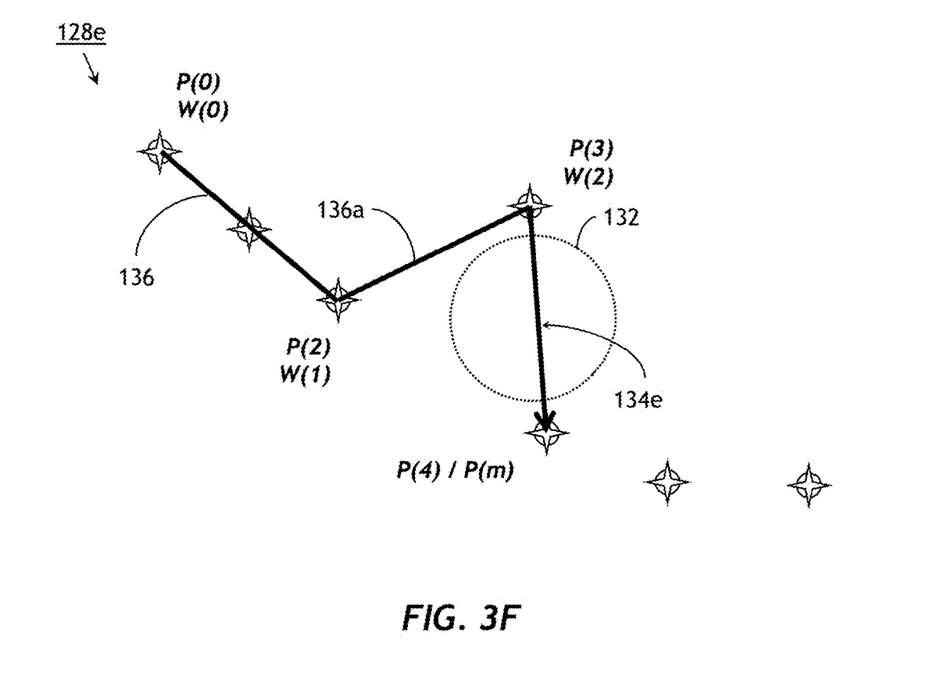

Referring specifically to FIG. 3F, the set of pattern points 128*e* may operate similarly to the set of pattern points 128*d* of FIG. 3E, except that the set of pattern points 128*e* reflects the designation by the MFMS 104 (FIG. 1) of the pattern point P(3) as the next waypoint W(2) of the sequence of waypoints 130 (FIG. 2B), generating a path (136*a*) to the waypoint W(2) from the waypoint W(1). The MFMS 104 may, via the line 134*e*, connect the current waypoint W(x) (e.g., the most recently designated waypoint W(2)) to the current pattern point P(m) (e.g., the pattern point P(4)) and determine whether any pattern points between W(x) and P(m) are not within the search radius 132 of the line 134*e*. There are no pattern points between W(x) and P(m), and the FMS 100 may increment m by continuing to the next pattern point.

Figure 3G:
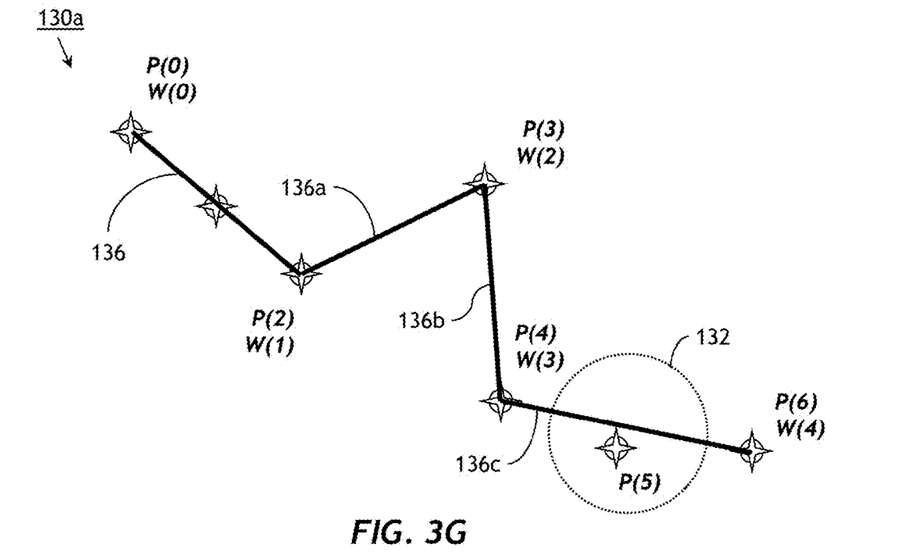
FIG. 3G illustrates an exemplary embodiment of a sequence of waypoints generated by the FMS of FIG. 1.

Referring specifically to FIG. 3G, the sequence of waypoints 130*a* may operate similarly to the set of pattern points 128*e* of FIG. 3F, except that the sequence of waypoints 130*a* reflects the designation by the MFMS 104 (FIG. 1) of the last pattern point P(6) as the last waypoint W(4) of the sequence of waypoints 130*a*, generating paths (136*b*-*c*) to the waypoints W(2), W(3), and W(4). For example, as the pattern point P(5) is within the search radius of the path (136*c*) connecting the waypoint W(3) to the pattern point P(6) (the waypoint W(4)), the pattern point P(5) may not be designated as a waypoint by the MFMS 104.

Figure 3H:
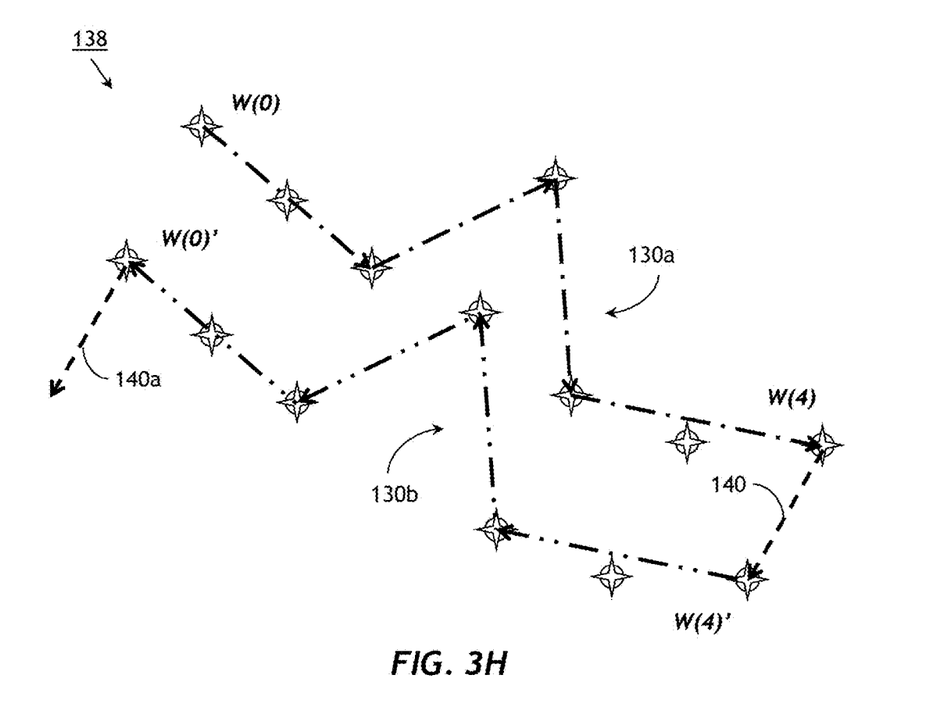
FIG. 3H illustrates an exemplary embodiment of a search pattern generated by the FMS of FIG. 1.

Referring specifically to FIG. 3H, the search pattern 138 may operate similarly to the sequence of waypoints 130*a* of FIG. 3G, except that the MFMS 104 (FIG. 1) may generate an offset sequence of waypoints 130*b*, the offset sequence of waypoints 130*b* offset from the sequence of waypoints 130*a* by a track space offset 140 applied by the MFMS 104. The track space offset 140 may be identical to the search radius 132 of FIGS. 3A-3G, or the track space offset 140 may be determined by the MFMS 104 according to factors such as the bank rate of the searching aircraft. The length and heading of the track space offset 140 may be selected or calculated so that any space between successive iterations of a sequence of waypoints 130 (e.g., between the generated sequence of waypoints 130*a* and the offset sequence of waypoints 130*b*) will not be overlooked by the searching aircraft. The pilot may manually select and enter a track space offset 140 of any desired length and heading via the display unit 108 (FIG. 1). The track space offset 140 may connect successive iterations of the generated sequence of waypoints 130*a*-*b* until the search pattern 138 is fully constructed. For example, the track space offset 140 may connect the final waypoint W(4) of the generated sequence of waypoints 130*a* to the final waypoint W(4)' of the offset sequence of waypoints 130*b*, indicating a continuous path as the searching aircraft executes the search pattern 138 by traversing the generated sequence of waypoints 130*a* and continuing through the offset sequence of waypoints 130*b* in reverse order (from waypoint W(4)' to waypoint W(0)'. Similarly, when the searching aircraft reaches the initial waypoint W(0)' of the offset sequence of waypoints 130*b*, a further track space offset 140*a* may connect the offset sequence of waypoints 130*b* to further iterations of the generated sequence of waypoints until the search pattern 138 is completed.

Figure 4:
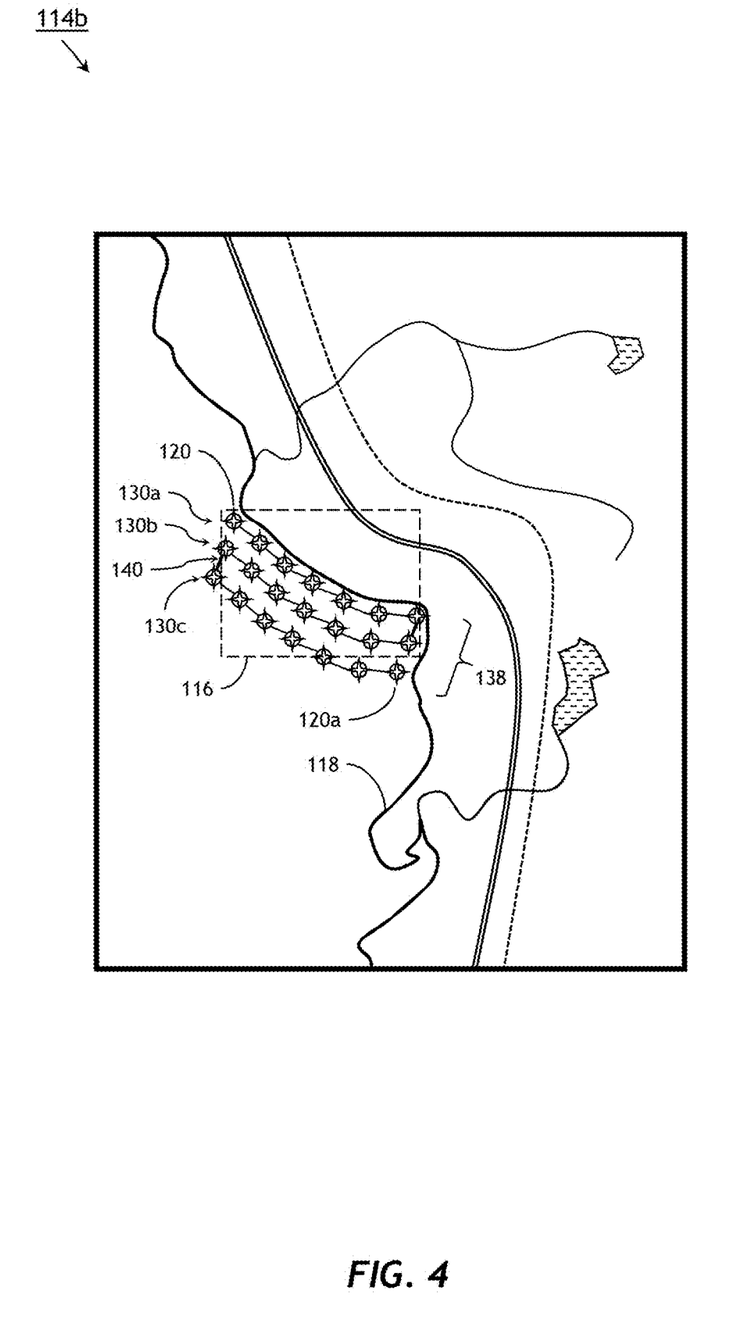
FIG. 4 illustrates an exemplary embodiment of a map portion generated by the FMS of FIG. 1.

Referring to FIG. 4, a map portion 114*b* displayed by the display unit 108 of FIG. 1 may operate similarly to the map portion 114*a* of FIG. 2B, except that the map portion 114*b* indicates the generation of a search pattern 138 by the MFMS 104 of FIG. 1. The search pattern 138 may enable one or more searching aircraft to cover a segment of the coastline 118 within the search pattern area 116, proceeding from a starting waypoint 120 through successive iterations of the generated sequence of waypoints 130*a-c* (linked by track space offsets 140) to an end waypoint 120*a*. The MFMS 104 may evaluate or approve a generated search pattern 138 before displaying the search pattern 138 to the pilot or crew of a searching aircraft via the display unit 108. The MFMS 104 may forward a generated search pattern 138 to a rerouter or coastal boundary pattern (CBP) finder of the MFMS (or the FMS 102) to evaluate or modify the generated search pattern 138 according to terrain avoidance and altitude factors. For example, one or more searching aircraft executing the generated search pattern 138 at an altitude of, e.g., 200 feet AGL or lower may risk a near-miss or collision with natural terrain elements such as mountains or coastal cliffs, or with a no-flight zone or similar designated airspace to be avoided.

Figure 5A:
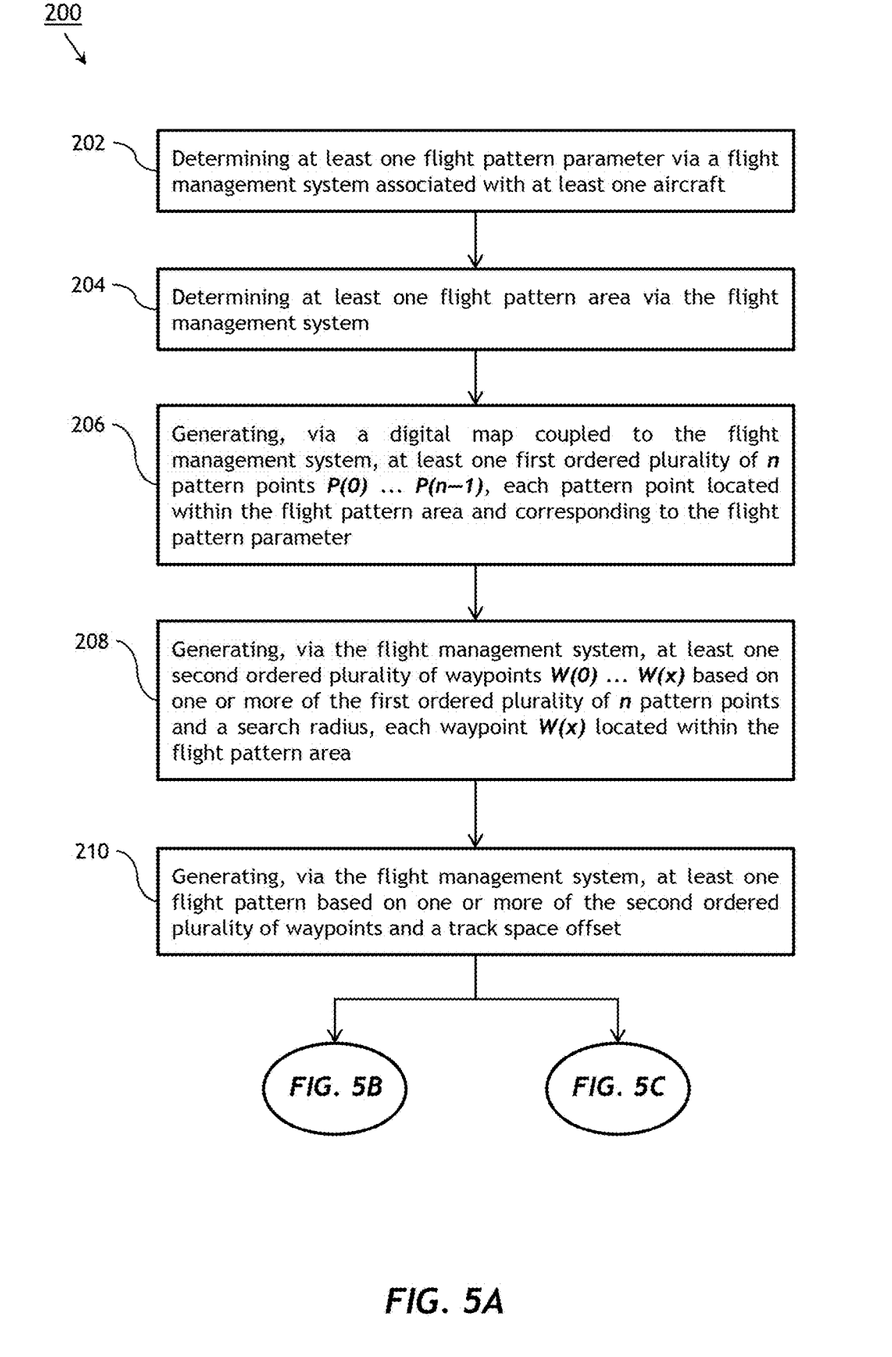
FIGS. 5A-5C are process flow diagrams illustrating exemplary embodiments of a method according to the inventive concepts disclosed herein.
Figure 5B:
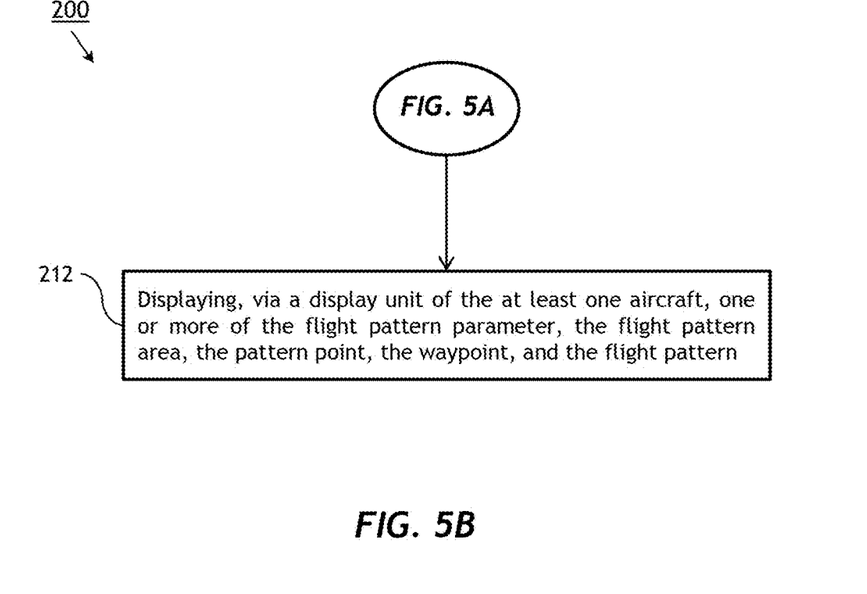
Figure 5C:
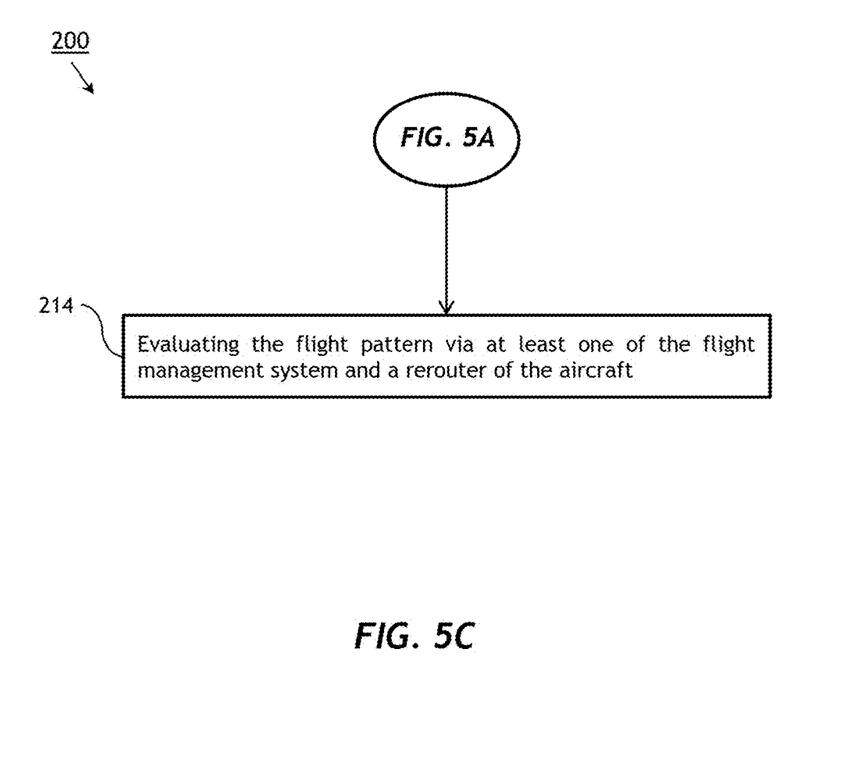

Referring now to FIGS. 5A-5C, an exemplary embodiment of a method 200 for digital map enabled search pattern generation according to the inventive concepts disclosed herein may be implemented by the flight deck 100 in some embodiments, and may include one or more of the following steps. At a step 202, the GFP determines a flight pattern parameter to be followed by a search pattern or by a searching aircraft executing the search pattern. For example, the MFMS may select a coastline, a natural feature, a manmade feature, or a political boundary.

At a step 204, the GFP determines a flight pattern area within which the search pattern will be followed.

At a step 206, the PLC generates, via a digital map, an ordered set of n pattern points, each pattern point located within the flight pattern area and following the selected flight pattern parameter.

At a step 208, the MFMS generates a sequence of waypoints based on the ordered set of n pattern points and a predetermined search radius, each waypoint located within the flight pattern area. For example, given an ordered set of n pattern points $P(0) \ldots P(n-1)$, the MFMS may designate the first pattern point $P(0)$ as the first waypoint $W(0)$ of the sequence of waypoints $W(0) \ldots W(x)$. The MFMS may set the value of m to 1 and then, while m<n, connect the most recently designated waypoint $W(x)$ to the most recently designated pattern point $P(m)$ by a straight line and determine if any pattern points between $W(x)$ and $P(m)$ are not within the search radius of the connecting line. If each pattern point between $W(x)$ and $P(m)$ is within the search radius of the connecting line, the MFMS may increment m; otherwise the MFMS may increment x by designating the pattern point $P(m-1)$ as the next waypoint $W(x)$. The MFMS may designate the last pattern point $P(n-1)$ as the last waypoint $W(x)$ of the sequence of waypoints. The search radius may be chosen by the pilot or calculated by the MFMS based on, e.g., a specification, speed, bank rate, or altitude of the searching aircraft; a windspeed, visibility, or sea height of the flight pattern area; or a search target.

At a step 210, the MFMS generates a search pattern based on the generated sequence of waypoints and a determined track space offset. The track space offset may be based on the determined search radius as well as the determined search pattern area.

Referring to FIG. 5B, the method 200 may include an additional step 212. At the step 212, a display unit receives (via the M-PVI 110) and displays the determined flight pattern parameter, the determined flight pattern area, the generated set of pattern points, the generated sequence of waypoints, or the generated search pattern.

Referring to FIG. 5C, the method 200 may include an additional step 214. At the step 214, the MFMS or a rerouter of the searching aircraft evaluates the generated search pattern. For example, the generated search pattern may be evaluated or modified based on terrain avoidance or collision avoidance considerations.

As will be appreciated from the above, systems and methods according to embodiments of the inventive concepts disclosed herein may provide a more efficient means of generating impromptu search patterns for coastal search and rescue, surveillance, seek-and-destroy, and other applications, reducing overall pilot workload. Furthermore, systems and methods according to embodiments of the inventive concepts disclosed herein may efficiently optimize search patterns in view of the diverse array of sensors and other features available to search aircraft, and the individual specifications of each aircraft.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A digital map enabled flight management system (FMS), comprising:
    a graphical flight planner (GFP) configured to define at least one flight pattern parameter and at least one flight pattern area associated with at least one aircraft;
    a digital map coupled to the GFP and configured to generate a first ordered plurality of n pattern points $P(0) \ldots P(n-1)$, each pattern point corresponding to a location within the at least one flight pattern area and to the at least one flight pattern parameter; and
    the flight management system (FMS) including one or more processors coupled to the GFP and to the digital map, the one or more processors configured to: generate at least one second ordered plurality of waypoints $W(0) \ldots W(x)$ based on (i) one or more of the first ordered plurality of pattern points, and (ii) a single search radius determined by a variety of contributing factors, two or more waypoints corresponding to a pattern point; and generate a single search pattern based on (i) two or more of the at least one second ordered plurality of waypoints, and (ii) a track space offset to separate at least one third ordered plurality of waypoints W(X)' . . . W(0)' from the at least one second ordered plurality of waypoints, the search pattern including the at least one second ordered plurality of waypoints connected to a portion of the first ordered plurality of n pattern points; and at least one display unit configured to display the at least one search pattern.

2. The digital map enabled FMS of claim 1, wherein the GFP is configured to define the at least one flight pattern parameter and the at least one flight pattern area based on at least one user input.

3. The digital map enabled FMS of claim 2, wherein the at least one display unit is an interactive display unit coupled to the GFP and configured to receive the at least one user input.

4. The digital map enabled FMS of claim 3, wherein the system is embodied in a mobile device and the interactive display unit includes at least one of a touchscreen of the device and a keypad of the mobile device.

5. The digital map enabled FMS of claim 1, wherein the system is embodied aboard the at least one aircraft.

6. The digital map enabled FMS of claim 1, wherein the FMS is a ground-based FMS wirelessly coupled to the at least one display unit, and the at least one display unit includes at least one display unit of the at least one aircraft.

7. The digital map enabled FMS of claim 1, wherein:
the at least one flight pattern area includes a search pattern boundary comprising at least one of a polygonal area and an area of freeform shape; and
the at least one flight pattern parameter includes at least one of a coastline, a political boundary, a natural feature, and a manmade feature.

8. The digital map enabled FMS of claim 1, wherein the FMS is further configured to approve one or more of the at least one second ordered plurality of waypoints and the at least one search pattern.

9. The digital map enabled FMS of claim 1, wherein the at least one track space offset is based on the search radius.

10. The digital map enabled FMS of claim 1, wherein the at least one search radius is selectable or predetermined based on at least one of:
at least one search target associated with the at least one flight pattern parameter or the at least one flight pattern area;
a specification of the at least one aircraft;
a speed of the at least one aircraft;
an altitude of the at least one aircraft;
a bank rate of the at least one aircraft;
a windspeed associated with the at least one flight pattern area;
a visibility associated with the at least one flight pattern area; and
a sea height associated with the at least one flight pattern area.

11. The digital map enabled FMS of claim 1, wherein the FMS is configured to generate the at least one second ordered plurality of waypoints by:
designating the first pattern point P(0) as the first waypoint W(0);
setting m=1; and
while m<n:
designating the first waypoint W(0) as a current waypoint W(x);
connecting the current waypoint W(x) to a current pattern point P(m) by a straight line;
if each pattern point between the current waypoint W(x) and the current pattern point P(m) is within the search radius of the straight line, incrementing m and designating pattern point P(m+1) as the current pattern point P(m);
if each pattern point between the current waypoint W(x) and the current pattern point P(m) is not within the search radius of the straight line, incrementing x and m and designating pattern point P(m−1) as the next current waypoint W(x); and
designating pattern point P(n−1) as the current waypoint W(x).

12. An apparatus for digital map enabled search pattern generation, including one or more processors configured to:
determine at least one flight pattern parameter including at least one of a coastline, a political boundary, a natural feature, and a manmade feature;
determine at least one flight pattern area corresponding to at least one aircraft;
retrieve, from at least one digital map coupled to the one or more processors, at least one first ordered plurality of n pattern points P(0) . . . P(n−1), each pattern point located within the at least one flight pattern area and corresponding to the at least one flight pattern parameter;
generate at least one second ordered plurality of waypoints W(0) . . . W(x) based on (i) one or more of the at least one first ordered plurality of n pattern points, and (ii) a single search radius determined by a variety of contributing factors, two or more waypoints located within the at least one flight pattern area and corresponding to a pattern point; and
generate, via a flight management system, a single search pattern for display or approval for display on a display unit based on (i) two or more of the second ordered plurality of waypoints, (ii) and a track space offset to separate at least one third ordered plurality of waypoints W(X)' . . . W(0)' from the at least one second ordered plurality of waypoints, wherein the search pattern includes the at least one second ordered plurality of waypoints connected to a portion of the first ordered plurality of n pattern points.

13. The apparatus of claim 12, wherein the one or more processors are configured to generate the at least one second ordered plurality of waypoints by:
designating the first pattern point P(0) as the first waypoint W(0);
setting m=1; and
while m<n:
designating the first waypoint W(0) as a current waypoint W(x);
connecting the current waypoint W(x) to a current pattern point P(m) by a straight line;
if each pattern point between the current waypoint W(x) and the current pattern point P(m) is within the search radius of the straight line, incrementing m and designating pattern point P(m+1) as the current pattern point P(m);
if each pattern point between the current waypoint W(x) and the current pattern point P(m) is not within the search radius of the straight line, incrementing x and m and designating pattern point P(m−1) as the current waypoint W(x); and designating pattern point P(n−1) as the current waypoint W(x).

14. A method for digital map enabled search pattern generation, comprising:

determining at least one flight pattern parameter via a flight management system (FMS) associated with at least one aircraft, the FMS comprising one or more processors;

determining, via the FMS, at least one flight pattern area;

generating, via a digital map coupled to the FMS, at least one first ordered plurality of n pattern points P(0) . . . P(n−1), each pattern point located within the at least one flight pattern area and corresponding to the at least one flight pattern parameter;

generating, via the FMS, at least one second ordered plurality of waypoints W(0) . . . W(x) based on (i) one or more of the at least one first ordered plurality of n pattern points, and (ii) a single search radius determined by a variety of contributing factors, two or more waypoints located within the at least one flight pattern area and corresponding to a pattern point;

generating, via the FMS, a single search pattern based on (i) two or more of the second ordered plurality of waypoints, and (ii) a track space offset to separate at least one third ordered plurality of waypoints W(X)' . . . W(0)' from the at least one second ordered plurality of waypoints, wherein the search pattern includes the at least one second ordered plurality of waypoints connected to a portion of the first ordered plurality of n pattern points; and providing the search pattern for display or approval for display on a display unit.

15. The method of claim 14, wherein, determining at least one flight pattern parameter via a flight management system (FMS) associated with at least one aircraft includes determining at least one of a coastline, a political boundary, a natural feature, and a manmade feature based on a user input and a flight plan of the at least one aircraft.

16. The method of claim 14, wherein generating, via the FMS, at least one second ordered plurality of waypoints W(0) . . . W(x) based on (i) one or more of the at least one first ordered plurality of n pattern points, and (ii) a search radius, each waypoint located within the at least one flight pattern area and corresponding to a pattern point includes:

designating the first pattern point P(0) as the first waypoint W(0);

setting m=1; and while m<n:

designating the first waypoint W(0) as a current waypoint W(x);

connecting the current waypoint W(x) to a current pattern point P(m) by a straight line;

if each pattern point between the most recently designated waypoint W(x) and the current pattern point P(m) is within the search radius of the straight line, incrementing m and designating pattern point P(m+1) as the current pattern point P(m);

if each pattern point between the current waypoint W(x) and the current pattern point P(m) is not within the search radius of the straight line, incrementing x and m and designating pattern point P(m−1) as the current waypoint W(x); and designating pattern point P(n−1) as the current waypoint W(x).

17. The method of claim 14, wherein generating, via the FMS, at least one second ordered plurality of waypoints W(0) . . . W(x) based on (i) one or more of the at least one first ordered plurality of n pattern points, and (ii) a search radius, each waypoint located within the at least one flight pattern area and corresponding to a pattern point includes:

determining the search radius based on at least one of:

at least one search target associated with the at least one flight pattern parameter or the at least one flight pattern area;

a specification of the at least one aircraft;

a speed of the at least one aircraft;

an altitude of the at least one aircraft;

a bank rate of the at least one aircraft;

a windspeed associated with the at least one flight pattern area;

a visibility associated with the at least one flight pattern area; and a sea height associated with the at least one flight pattern area.

18. The method of claim 14, wherein generating, via the FMS, a single search pattern based on (i) two or more of the second ordered plurality of waypoints, and (ii) a track space offset to separate at least one third ordered plurality of waypoints W(x)' . . . W(0)' from the at least one second ordered plurality of waypoints, wherein the search pattern includes the at least one second ordered plurality of waypoints connected to a portion of the first ordered plurality of n pattern points includes:

generating, via the FMS, at least one flight pattern including a search pattern based on the second ordered plurality of waypoints and a track space offset based on the at least one search radius and the at least one flight pattern area.

19. The method of claim 14, further comprising:

displaying, via a display unit of the at least one aircraft, one or more of the at least one flight pattern parameter, the at least one flight pattern area, the at least one pattern point, the at least one waypoint, and the search pattern.

20. The method of claim 14, further comprising:

evaluating the at least one search pattern via at least one of the FMS and a rerouter of the at least one aircraft.

* * * * *